(12) United States Patent
Hernandez-Ellsworth et al.

(10) Patent No.: US 11,494,755 B2
(45) Date of Patent: Nov. 8, 2022

(54) SYSTEMS AND METHODS FOR PROVIDING LOW-LATENCY ACCESS TO CARDHOLDER LOCATION DATA AND DETERMINING MERCHANT LOCATIONS AND TYPES

(71) Applicant: First Performance Corporation, Atlanta, GA (US)

(72) Inventors: William M. Hernandez-Ellsworth, Atlanta, GA (US); Sosh A. Howell, Atlanta, GA (US); Walter G. Ley, Atlanta, GA (US)

(73) Assignee: First Performance Corporation, Atlanta, GA (US)

( * ) Notice: Subject to any disclaimer, the term of this patent is extended or adjusted under 35 U.S.C. 154(b) by 0 days.

(21) Appl. No.: 16/107,348

(22) Filed: Aug. 21, 2018

(65) Prior Publication Data
US 2019/0057374 A1  Feb. 21, 2019

Related U.S. Application Data

(60) Provisional application No. 62/548,100, filed on Aug. 21, 2017.

(51) Int. Cl.
*G06Q 20/32* (2012.01)
*G06F 16/29* (2019.01)
(Continued)

(52) U.S. Cl.
CPC ......... *G06Q 20/3224* (2013.01); *G06F 16/29* (2019.01); *G06Q 20/409* (2013.01); *H04W 4/02* (2013.01)

(58) Field of Classification Search
CPC ............. G06Q 20/3224; G06Q 20/409; G06Q 10/0838; G06Q 20/00; G06Q 20/02; G06Q 20/08; G06Q 20/0855; G06Q 20/22; G06Q 20/30; G06Q 20/32; G06Q 20/322; G06Q 20/325; G06Q 20/34; G06Q 20/347; G06Q 20/351; G06Q 20/352; G06Q 20/353; G06Q 20/36; G06Q 20/363; G06Q 20/3674; G06Q 20/382; G06Q 30/0205; G06Q 30/0261; G06Q 30/0266; G06Q 90/00; G06Q 99/00; G06F 16/29; G06F 16/00; G06F 16/23; G06F 16/30; G06F 16/387; H04W 4/02;
(Continued)

(56) References Cited

U.S. PATENT DOCUMENTS 9,880,282 B1 * 1/2018 Mendis ............... G01S 19/39
2006/0079244 A1 * 4/2006 Posner ............... H04W 60/04
455/456.1
(Continued)

*Primary Examiner* — Scott S Trotter
*Assistant Examiner* — Divesh Patel
(74) *Attorney, Agent, or Firm* — Troutman Pepper Hamilton Sanders LLP; James E. Schutz; Christopher C. Close, Jr.

(57) ABSTRACT

A system includes one or more memory devices storing instructions, and one or more processors configured to provide low-latency access to cardholder location information by receiving periodically updated location information from a mobile device associated with the account holder and updated associated systems with the information prior to the user initiating a transaction. At the time of a transaction, necessary systems can quickly access the stored information and authenticate transactions appropriately.

7 Claims, 12 Drawing Sheets

(51) Int. Cl.
*G06Q 20/40* (2012.01)
*H04W 4/02* (2018.01)

(58) Field of Classification Search
CPC ....... H04W 4/00; H04W 4/023; H04W 4/025; H04W 4/029; H04W 12/00503; H04W 12/06; H04W 12/0602; H04W 12/0605; H04W 12/1004; H04W 64/003
See application file for complete search history.

(56) References Cited

U.S. PATENT DOCUMENTS

| | | | | |
|---|---|---|---|---|
| 2010/0246467 | A1* | 9/2010 | Song | H04W 60/04 370/312 |
| 2011/0201348 | A1* | 8/2011 | Murray | H04W 4/029 455/456.1 |
| 2014/0013051 | A1* | 1/2014 | Qian | G06F 3/0607 711/115 |
| 2014/0279494 | A1* | 9/2014 | Wiesman | G06Q 20/3224 705/44 |
| 2015/0106268 | A1* | 4/2015 | Carroll | H04W 12/126 705/44 |
| 2015/0302409 | A1* | 10/2015 | Malek | G06Q 20/3224 705/44 |
| 2015/0310434 | A1* | 10/2015 | Cheung | G06Q 20/3224 705/44 |
| 2016/0011789 | A1* | 1/2016 | Tsuchiya | G06F 3/0608 711/166 |
| 2016/0098702 | A1* | 4/2016 | Marshall | G06Q 20/425 705/44 |

\* cited by examiner

SYSTEMS AND METHODS FOR PROVIDING LOW-LATENCY ACCESS TO CARDHOLDER LOCATION DATA AND DETERMINING MERCHANT LOCATIONS AND TYPES

CROSS REFERENCE TO RELATED APPLICATIONS

This application claims priority under 35 U.S.C. 119 to U.S. Provisional Patent Application No. 62/548,100, entitled "Low-latency Methods for Accessing Cardholder and Account Holder Location Data and Accurately Determining Merchant Locations and Location-Types," filed 21 Aug. 2017, the contents of which are incorporated by reference in their entirety as if fully set forth herein.

FIELD OF INVENTION

The present disclosure relates to systems and methods for providing low-latency access to a cardholder's or account holder's location data when, for example, the cardholder is conducting a transaction. The present disclosure also relates to systems and methods for determining merchant location information and merchant location type based at least in part on cardholder location data when the cardholder conducts a transaction with the merchant.

BACKGROUND

Transaction cards (referred herein as "cards") generally include cards or devices used to make financial transactions in virtual or physical form. Cards can include, but are not limited to, credit cards, debit cards, ATM cards, prepaid cards, private label cards, rewards cards, virtual cards, mobile devices used to make payments, and corporate or fleet cards. Typically, advanced systems monitor these cards and perform a variety of functions to increase the overall value for the card issuer and/or the cardholder (alternatively, account holder, either of which can refer to a person possessing proper ownership of a card or account used for a financial transaction). As will be understood by one of skill in the art, such accounts can include as nonlimiting examples accounts used in money transfers, faster payments through a mobile device, direct withdrawals, and virtual card accounts. To perform their function well, these advanced card monitoring systems (e.g., fraud detection systems, geolocation monitoring systems, authorization systems, spend prediction systems, and incentive or reward platforms) rely on accurate and quickly accessible data related to the account holder and/or a set of transactions. In particular, these monitoring systems rely in part on data related to the location of the account holders and their transactions.

Current solutions exist for determining an account holder's location data separate and apart from any metadata associated with a transaction performed by that account holder. These methods generally involve querying an account holder's mobile device location at the time of the transaction in an effort to provide increased authentication at the time of authorizing the transaction. For example, in the event of a suspected fraudulent transaction, these solutions attempt to leverage an account holder's associated mobile device information to identify the account holder's location at the moment of the transaction. If the system determines that the account holder's mobile device location at the time of the transaction is out of the normal range from the transaction's originating location (for example, by using the mobile device's GPS information), the system can confidently mark the transaction as fraudulent. But such systems are inadequate for providing accurate, near-real-time authorization based on current location data.

First, such existing systems yield process latency that is too great to be useful to many card-monitoring systems. For example, existing systems result in process latency that exceeds standards for card authorization time, meaning that the account holder's location data cannot be used as a resource in a real-time transaction authorization process. As will be appreciated, when it is time to authenticate a transaction, existing systems attempt to determine cardholder location data by making a request to a mobile carrier or a third-party service having access to the necessary mobile device location data. The mobile carrier or third-party service must then make a request to the actual mobile device, which then triggers and processes the device's geolocation method, and subsequently relays the location data back to the authorization system, which in turn makes use of the data. The latency associated with this method is far too great to be useful in a real-time authorization process.

Also, existing solutions are deficient because they fail to account for inconsistencies between a merchant's actual location data and location data that may be associated with that merchant. For example, for point-of-sale transactions, existing systems typically compare the account holder's mobile device location data against location data associated with the transaction to determine if the account holder is in the location from which the authorization request originated. Existing systems typically infer the originating location of the transaction request by referring to the address of record for the merchant associated with the transaction. As will be appreciated, there are a variety of issues associated with the way merchant addresses are chosen and stored, any one of which can compromise the reliability of this stored information. For example, some merchants have an address listed for their point-of-sale terminal that may be an owner's home address instead of a business address. Some merchants may not have updated their listed address after moving storefronts, and others have multiple locations that may not be differentiated within their point-of-sale address registry. Some merchants are mobile-location merchants (i.e., point-of-sale merchants that maintain a static business addresses while transacting in various locations). Mobile-location merchants can include, but are not limited to, food trucks, street vendors, trade shows vendors, or pop-up shops. As will be appreciated, the inability of existing systems to accurately determine the originating location of a transaction decreases the overall functionality of those systems that are supposed to be monitoring the information. For example, an existing system can accurately determine that an account holder's location is in a given geographic region, and that account holder can try to make a purchase at a food truck within that geographic region. But if the address of the food truck that is listed with the card issuer is outside of that given geographic region, that existing card authorization system will identify the transaction as occurring in a different geographic from where the account holder is transacting. Because the transaction location is outside of the geographic region of the account holder, the existing authorization system may incorrectly decline the transaction.

In other example scenarios, situations may arise where existing systems have associated location data that may be inaccurate such as when an account holder travels to a new country without informing their card issuer. This can result in an incorrect denial of the transaction, which in turn results in an overall loss of value for all participants in the value stream: an inconvenience and loss of time for the account holder, a loss of revenue for the merchant, and a loss of customer satisfaction, potential loss of customer loyalty and retention, and loss of revenue for the card issuer. As will be appreciated, such false identifications result from existing systems not being able to accurately determine the real-time location of the account holder.

Likewise, existing systems are deficient in that they merely query account holder location in response to certain events. Accordingly, these existing systems are unable to determine when an event does not occur in response to the account holder being in a specific location. For example, existing card monitoring systems can monitor account holders for a period and then predict when those account holders will make a transaction whenever the account holders enter a certain geographic region. But because these systems only query the account holder's location information in response to the account holder initiating a transaction, the system is misinformed. In other words, the system is unaware of instances where the account holder entered that geographic region and did not make a transaction because the system only queried location information in response to a transaction being initiated. Accordingly, the overall predictive capabilities and underlying accuracy of the card monitoring system is compromised.

As an additional example, if a given account holder has a history of only withdrawing and depositing money from ATMs within a certain geographic region and then breaks from that normal behavior pattern to use a new ATM outside of that geographic region, existing systems may falsely flag this activity at this new ATM as fraudulent activity by the card issuer. Such a false flag can result in loss of value, as the account holder is unable to access their funds and the bank suffers a decline in customer satisfaction and a potential loss of revenue. Similarly, a rewards or incentive program may determine offering an incentive to purchase something from a merchant to a group of account holders within a certain geographic region will increase overall account holder satisfaction and revenue. But existing systems often incorrectly determine that an account holder is located within that certain geographic region and subsequently incorrectly offer that account holder an incentive. As a result, the account holder's satisfaction may decrease, and the card issuer may experience a loss of revenue and incurred cost as a result of the offer not being used. Additionally, due to the poor experience, there is the risk of the account holder closing their account or using that card less frequently.

SUMMARY

Aspects of the disclosed embodiments address deficiencies of existing systems. In particular, aspects of the disclosed technology include systems and methods for determining location data of an account holder in a low-latency manner such that the location data can be leveraged by transaction card authorization systems or other such systems having low-latency requirements. For example, aspects of the disclosed technology meet the general latency requirements of transaction card authorization systems, thereby allowing those systems to leverage the accurate location data to approve or decline transactions for point-of-sale, online, phone, and ATM transactions. Additionally, aspects of the disclosed technology include systems and methods for pairing this account holder location data with the location data from a point-of-sale transaction, which can be derived from determined locations and location-types of point-of-sale merchants. As will be appreciated, this accurate and quickly accessible location data can be used to, for example, augment card monitoring systems, such as fraud detection systems, authorization systems, or rewards, discounts, and promotional programs.

As noted, certain aspects of the disclosed systems and methods allow for the retrieval and storage of accurate geolocation data, which can augment card monitoring systems by providing low-latency access to the geolocation data. Mobile devices, such as smartphones, can monitor a person's location data as they move about their lives. Certain implementations of the disclosed technology poll and store this location data for each mobile device registered within the system. In certain embodiments, each time a registered user changes location beyond a defined distance from their previous location, the system can measure and record their new location as their most recent location. Aspects of the disclosed technology can store this newly recorded location data in a persistent data storage system where the information is kept up-to-date and is quickly accessible by an approved third-party system such as a card monitoring system. Additionally, the disclosed system can store past records of the mobile device user's location in a persistent data storage system such that the system can, for example, reference the past data to predict transaction events and account holder behavior, and build a set of accurate merchant locations and location-types.

Consistent with the disclosed embodiments, the system may include one or more memory devices storing instructions, and one or more processors configured to execute the instructions to perform steps of a method to provide low-latency access to cardholder location data and to determine merchant locations and types. The system may receive, by a first computing device, updated location information from a second computing device, the second computing device associated with an account holder. Responsive to the receipt, the system may determine, by the first computing device, whether location information associated with the account holder exists at the first computing device. Responsive to determining that location information associated with the account holder does not exist at the first computing device, the system may generate an entry in a first data group for storing information associated with the account holder and add information associated with the account holder to the entry in the first data group. Responsive to determining that location information associated with the account holder does exist at the first computing device and that the location information at the first computing device does not match the updated location information, the system may update the location information at the first computing device to include the updated location information and determine one or more output locations for the updated location information. Responsive to determining that the location information at the first computing device and the updated location information are matching location information, the system may determine one or more output locations for the matching location information. The system may then output the updated location information and/or the matching location information to a central storage.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although the above embodiments are described with respect to systems, it is contemplated that embodiments with identical or substantially similar features may alternatively be implemented as methods and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
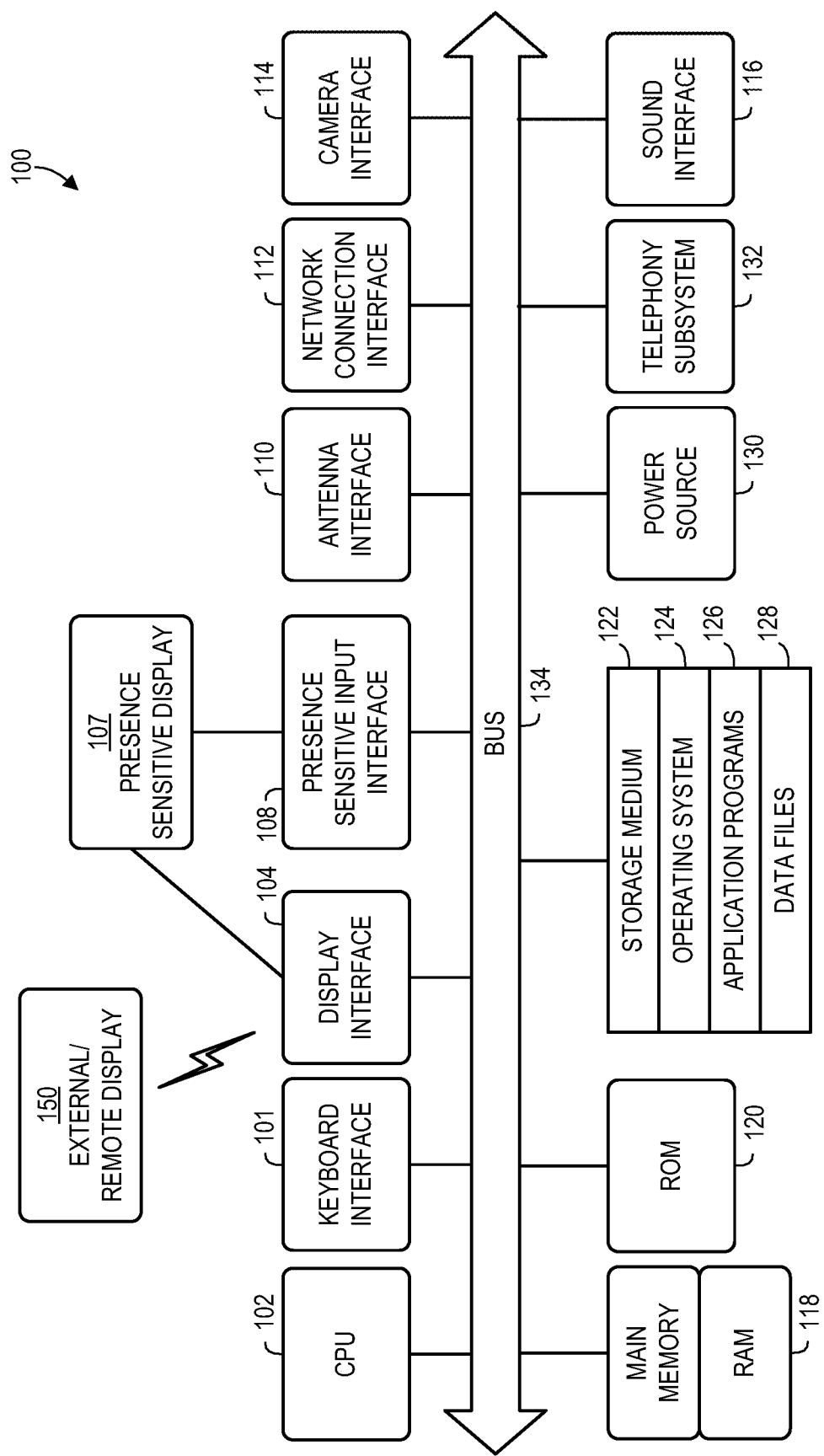
FIG. 1 is a block diagram of an illustrative computer system architecture 100, according to an example implementation.

Aspects of the disclosed technology may be implementing using at least some of the components illustrated in the computing device architecture 100 of FIG. 1. As shown, the computing device architecture includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display 150 that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display 150.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof In one example, the display interface 104 may be operatively coupled to a local display, such as a touch-screen display associated with a mobile device. In another example, the display interface 104 may be configured to provide video, graphics, images, text, other information, or any combination thereof for an external/remote display 150 that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display 150.

The computing device architecture 100 may include a keyboard interface 101 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 101, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes and a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices.

Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
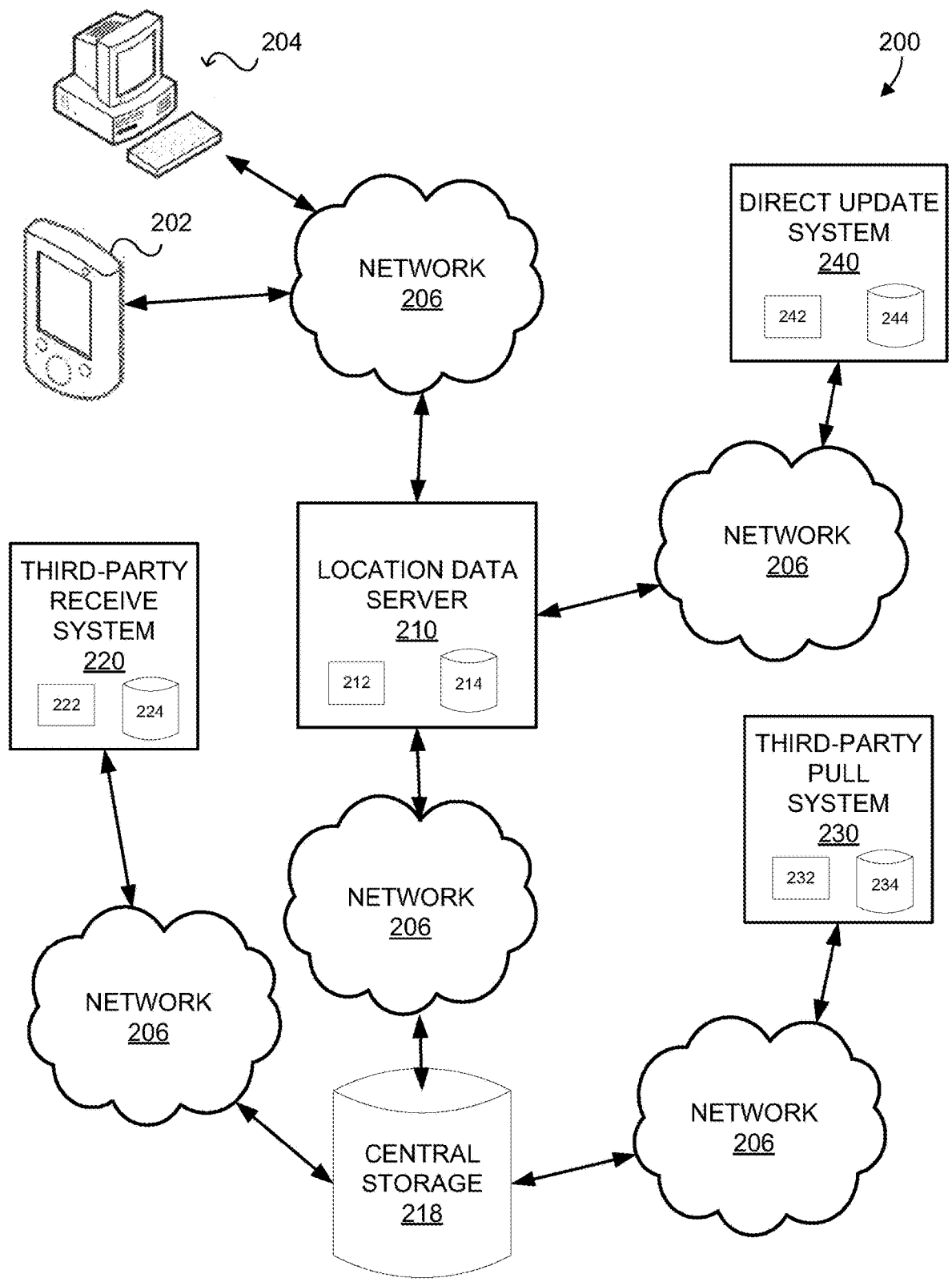
FIG. 2 is a diagram of exemplary environment 200 in which aspects of the disclosed data location caching systems and methods can be implemented.

FIG. 2 is a diagram of exemplary environment 200 in which aspects of the disclosed data location caching systems and methods can be implemented. The components and arrangements shown in FIG. 2 are not intended to limit the disclosed embodiments as the components used to implement the disclosed processes and features may vary. As shown, environment 200 may include user device 202, sales terminal 204, network 206, location data server 210, central storage 218, third-party receive system 220, third-party pull system 230, and direct update system 240, which, as applicable, may include more or less of the components shown in FIG. 1.

In some embodiments, user device 202 determines its geographic location as part of the disclosed systems and methods and then outputs that information to location data server 210. User device 202 can be one or more of a mobile device, smart phone, general purpose computer, tablet computer, laptop computer, telephone, PSTN landline, smart wearable device, voice command device, other mobile computing device, or any other device capable of communicating with network 206 and ultimately communicating with location data server 210. Users may include account holders or cardholders seeking to conduct business (e.g., make a purchase) from a merchant associated with sales terminal 204, which may be any device capable of communicating with network 206 and for conducting transactions (e.g., point-of-sale terminal, cash register, credit card processing terminal, or other similarly capable device). According to some embodiments, user device 202 may include one or more sensors sensor for obtaining biometric data associated with the user, such as a fingerprint scanner, a microphone and/or digital camera, a geographic location sensor for determining the location of the device and/or other location-determination capabilities (e.g., triangulation of cellular or wireless internet signals, and then relaying that information to a remote server), an input/output device such as a transceiver for sending and receiving data, a display for displaying digital images, one or more processors including an authentication processor, and a memory in communication with the one or more processors.

Network 206 may be of any suitable type, including individual connections via the internet such as cellular or WiFi networks. In some embodiments, network 206 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 206 may comprise any type of computer networking arrangement used to exchange data. For example, network 206 may be the Internet, a private data network, virtual private network using a public network, and/or other suitable connection(s) that enables components in system environment 200 to send and receive information between the components in environment 200. Network 206 may also include a public switched telephone network ("PSTN") and/or a wireless network.

Location data server 210 may comprise a computer system for receiving, storing, transmitting, and managing account holder location data, merchant location data, merchant type, and various other related information relating to the disclosed systems and methods. For example, location data server 210 can include various systems for receiving account holder location information, updating current and historical account holder location information, and analyzing merchant location information and type based on the account holder location information.

Central storage 218 may be used to store account holder location information (both current and historical) as well as merchant location data and information relating to merchant type. Central storage 218 may be accessible by location data server 210, third-party receive system 220, and third-party pull system 230. Though shown separately in FIG. 2, it should be understood that location data server 210 and central storage 218 may be co-located, according to some implementation.

Third-party receive system 220 may comprise a computer system for receiving updated information from central storage 218, including account holder location information, and for receiving requests from, and transmitting requested information to, sales terminal 204. Third-party receive system 220 may be configured to dynamically receive updates to account holder location information as such updates are determined by location data server 210 and made available to central storage 218. Thus, for example, third-party receive system 220 may receive requests from sales terminal 204 to verify location information for a user (e.g., the user associated with user device 202) who is attempting to conduct business with a merchant associated with sales terminal 204. In response to the request, third-party receive system 220 may transmit the requested information, which was dynamically received from central storage 218, to sales terminal 204. Though not shown in FIG. 2, it should be understood that third-party receive system 220 and sales terminal 204 are capable of communicating through network 206.

Similar to third-party receive system 220, third-party pull system 230 also may comprise a computer system for receiving information from central storage 218 and for receiving requests from, and transmitting requested information to, sales terminal 204. But in contrast to third-party receive system 220, third-party pull system 230 may be configured to request updated information from central storage 218 as opposed to dynamically receiving the updated information. Thus, in an example, third-party pull system 230 may receive requests from sales terminal 204 to verify location information for a user (e.g., the user associated with user device 202) who is attempting to conduct business with a merchant associated with sales terminal 204. In response to the request, third-party pull system 230 may request and receive updated account holder location information and then transmit that information to sales terminal 204. As above, though not shown in FIG. 2, it should be understood that third-party pull system 230 and sales terminal 204 are capable of communicating through network 206.

Direct update system 240 may comprise a computer system for receiving information directly from location data server 210. So, unlike third-party receive system 220 and third-party pull system 230, which may receive updated account holder location information from central storage 218, direct update system 240 may be in direct communication with location data server 210. Accordingly, direct update system 240 may dynamically receive updated account holder location information from location data server 210 or may request and receive the updated information from location data server 210 on an as-needed basis. Thus, in an example scenario, direct update system 240 may receive requests from sales terminal 204 to verify location information for a user (e.g., the user associated with user device 202) who is attempting to conduct business with a merchant associated with sales terminal 204. In response to the request, direct update system 240 may transmit the requested information if it has been dynamically received or may request and receive the updated account holder location information and then transmit that information to sales terminal 204. Again, though not shown in FIG. 2, it should be understood that direct update system 240 and sales terminal 204 are capable of communicating through network 206.

As shown in FIG. 2, each of location data server 210, third-party receive system 220, third-party pull system 230, and direct update system 240 may comprise one or more processors (212, 222, 232, and 242, respectively) for facilitating the disclosed systems and methods and one or more databases (214, 224, 234, and 244 respectively). Information stored in the databases may be accessed (e.g., retrieved, updated, and added to, as applicable) via network 206 by one or more devices of environment 200 and may further include information for implementing the various disclosed systems and methods.

For ease of discussion, embodiments may be described in connection with sales transactions between a user and a merchant. It is to be understood, however, that disclosed embodiments may be used in many other contexts. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

Figure 3:
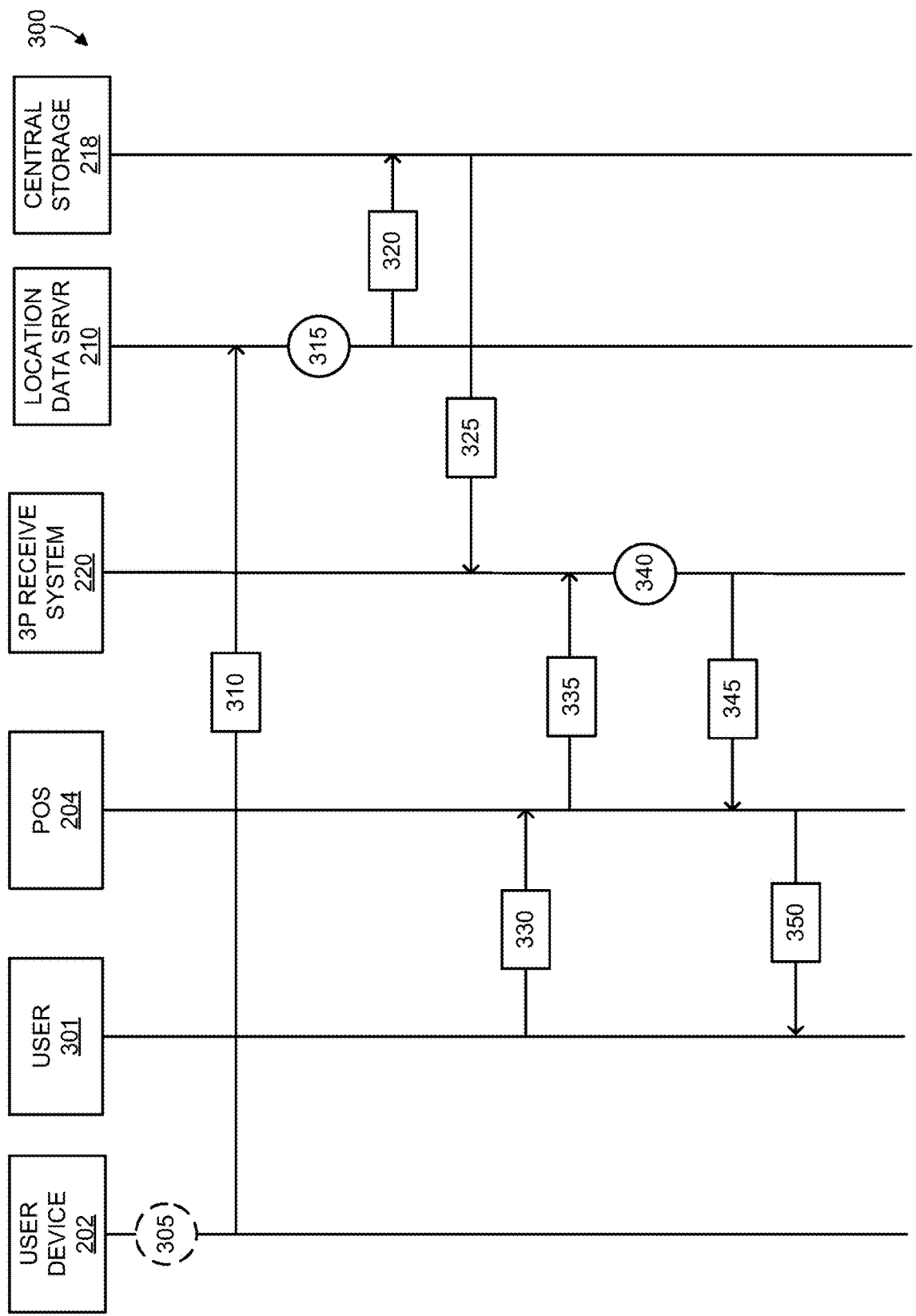
FIG. 3 is a diagram illustrating data flow and processes carried out by components involved in location data caching processes of the disclosed systems and methods, according to an example embodiment.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter FIG. 3 is a diagram illustrating data flow and processes 300 carried out by components involved in location data caching processes of the disclosed systems and methods, according to some embodiments. In particular, as shown in FIG. 3, user device 202 optionally determines 305 whether it has traveled a threshold distance since its last check-in with location data server 210 or if a predetermined time period since the last check-in has expired. This process will be discussed more thoroughly in relation to FIG. 11. If user device 202 determines it is appropriate to send location data, user device can output 310 current location data to location data server 210. As will be understood, location data can be GPS data, longitude, latitude, triangulated position from cell tower or Wi-Fi access point, city, state, country, time zone, or other location-identifying information as appropriate.

According to some embodiments, device location data may include unique device characteristics such as time zone, operating system version, browser version, user agent information, IP address, wireless carrier information, internet service provider information, or other data indicating the location or other device characteristic. In certain embodiments, user device 202 can output this current location data (e.g., in terms of absolute global latitude and longitude), to location data server 210 through an application-programming interface (API) along with identifying information for user 301 (i.e., the account holder) to uniquely link user 301 to the location data. This uniquely identifying information can be, for example, a unique identifier associated with the account holder's card, such as a unique ID or a salted card number. User device 202 may connect to location data server 210 through a secure communication protocol, such as HTTPS or a socket connection.

As shown in FIG. 3, after receiving the location data, location data server 210 can then process 315 the location data as will be discussed more thoroughly with respect to FIG. 7. As appropriate, location data server 210 can output 320 updated location data to central storage 218, and central storage 218 can then dynamically update 325 third-party receive system 220, which is configured to dynamically receive updated location information. As further shown in FIG. 3, user 301 can initiate 330 a transaction with a merchant associated with point of sale device 204, and point of sale device 204 can then initiate 335 a transaction authorization with third-party receive system 220. Third-party receive system 220 can then analyze 340 the transaction to determine whether it is authorized. For example, third-party receive system 220 can compare location data associated with the request received from point of sale system 204 to the updated location information received from central storage 218. If the location information matches, third-party receive system 220 can output 345 an authorization confirmation to point of sale system 204, which can in turn finalize 350 the transaction with user 301.

Figure 4:
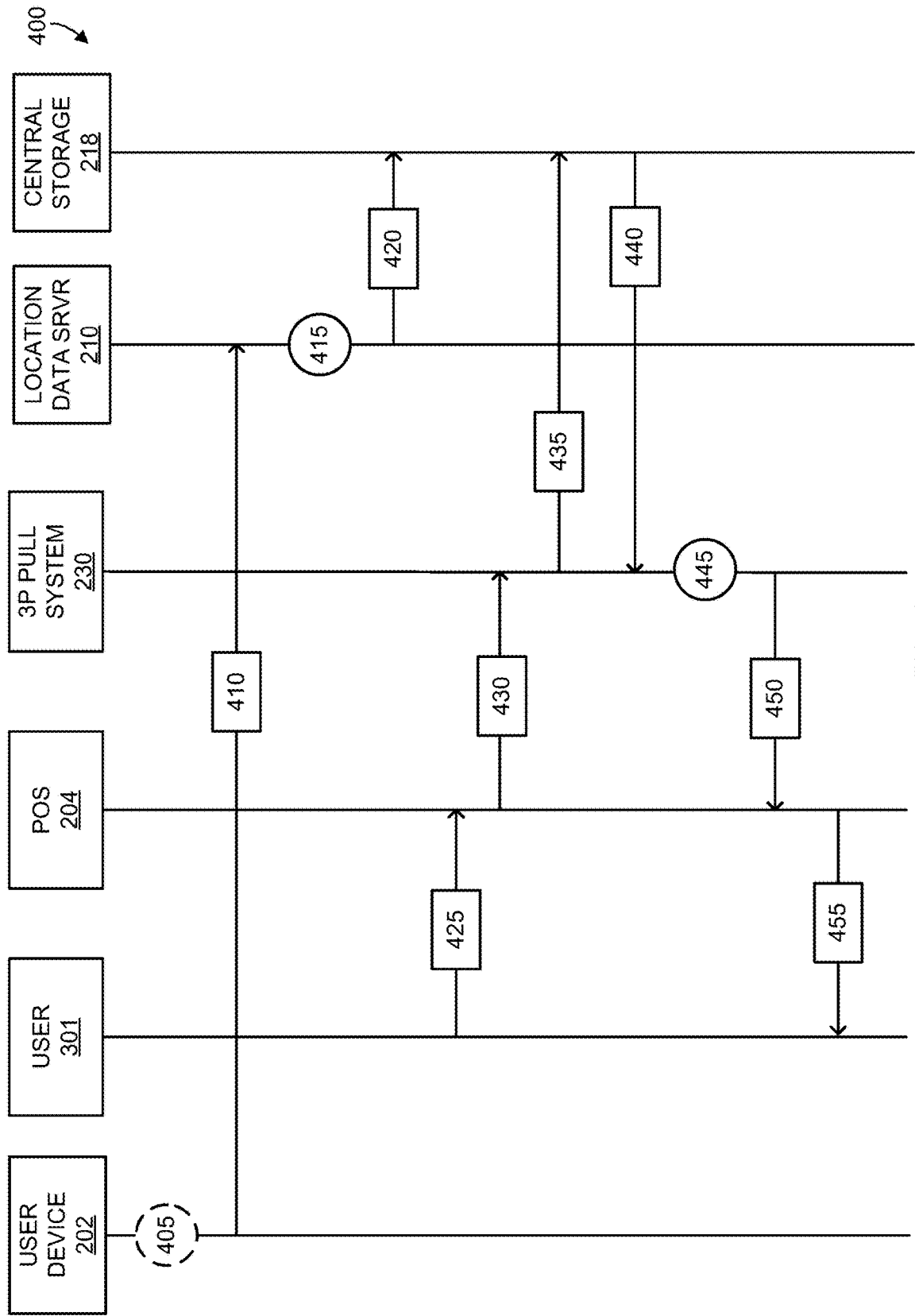
FIG. 4 is a diagram illustrating data flow and processes carried out by components involved in location data caching processes of the disclosed systems and methods, according to an example embodiment.

FIG. 4 also is a diagram illustrating data flow and processes 400 carried out by components involved in location data caching processes of the disclosed systems and methods, according to some embodiments. As was shown in FIG. 3, in FIG. 4, a user device 202 optionally determines 405 whether it has traveled a threshold distance since its last check-in with location data server 210 or if a predetermined time period since the last check-in has expired. If user device 202 determines it is appropriate to send location data, user device can output 410 current location data to location data server 210. As in FIG. 3, location data server 210 can then process 415 the location data. As appropriate, location data server 210 can output 420 updated location data to central storage 218.

Similar to FIG. 3, in FIG. 4, user 301 can initiate 425 a transaction with a merchant associated with point of sale device 204, and point of sale device 204 can then initiate 430 a transaction authorization with third-party pull system 230. Third-party pull system 230 can then request 435 updated location information associated with user 310 (and user device 202) from central storage 218, which can then output 440 the requested information. Third-party pull system 230 can then analyze 445 the transaction to determine whether it is authorized by, for example, comparing location data associated with the request received from point of sale system 204 to the updated location information received from central storage 218. If the location information matches, third-party pull system 230 can output 450 an authorization confirmation to point of sale system 204, which can in turn finalize 455 the transaction with user 301.

Figure 5:
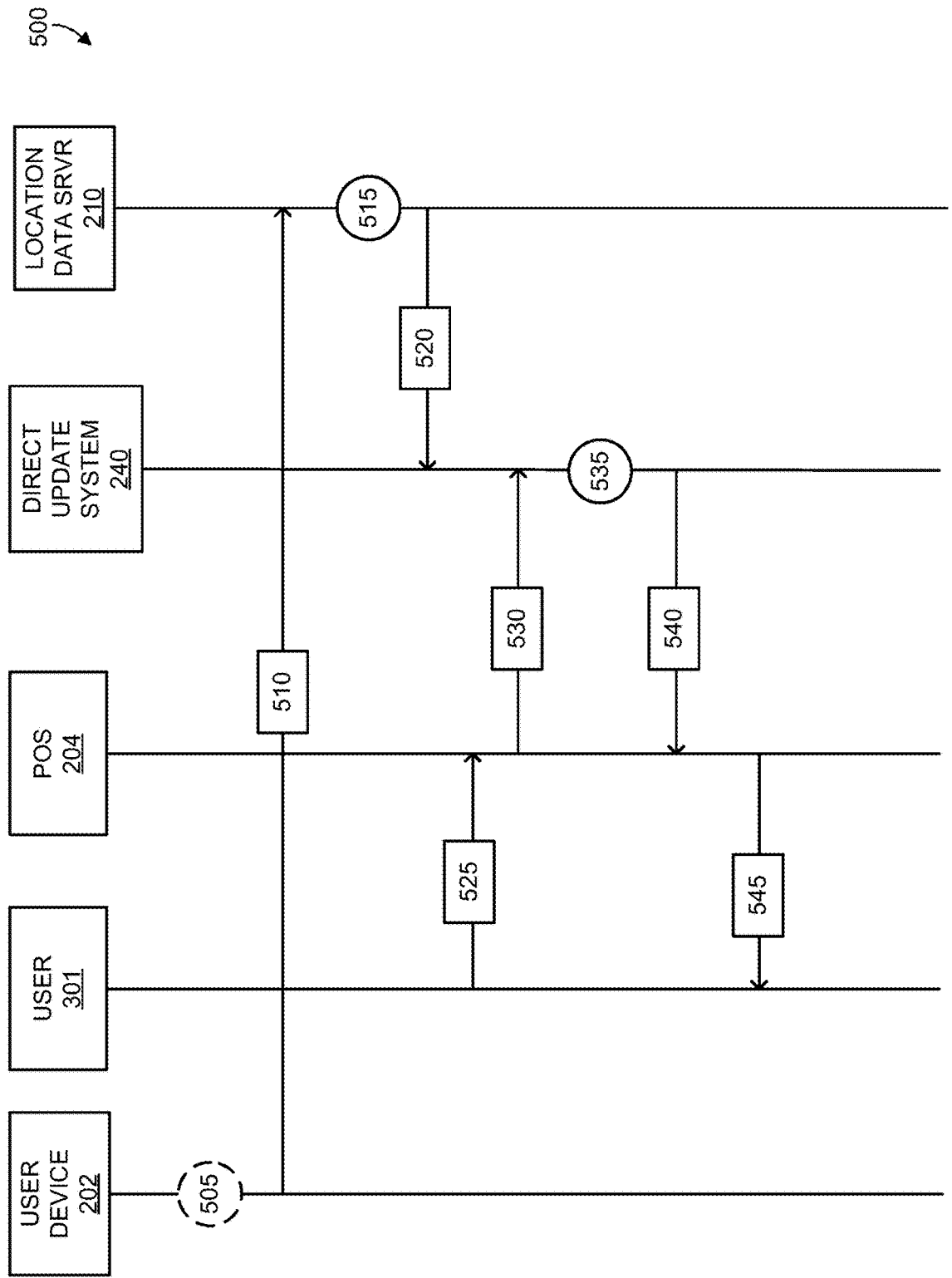
FIG. 5 is a diagram illustrating data flow and processes carried out by components involved in location data caching processes of the disclosed systems and methods, according to an example embodiment.

FIG. 5 is another diagram illustrating data flow and processes 500 carried out by components involved in location data caching processes of the disclosed systems and methods, according to some embodiments. As was shown in FIGS. 3 and 4, a user device 202 optionally determines 505 whether it has traveled a threshold distance since its last check-in with location data server 210 or if a predetermined time period since the last check-in has expired. If user device 202 determines it is appropriate to send location data, user device can output 510 current location data to location data server 210. As above, location data server 210 can then process 515 the location data. As appropriate, location data server 210 can output 520 updated location data directly and dynamically to direct update system 240 in configurations where direct update system 240 is configured for receiving dynamic updates. As shown in FIG. 5, direct update system 240 is configured to communicate directly with location data server 210 and does not receive updates from central storage 218.

Similar to the foregoing examples, user 301 can initiate 525 a transaction with a merchant associated with point of sale device 204, and point of sale device 204 can then initiate 530 a transaction authorization with direct update system 240. Direct update system 240 can then analyze 535 the transaction to determine whether it is authorized by, for example, comparing location data associated with the request received from point of sale system 204 to the updated location information dynamically and directly received from location data server 210. If the location information matches, direct update system 240 can output 540 an authorization confirmation to point of sale system 204, which can in turn finalize 545 the transaction with user 301.

Figure 6:
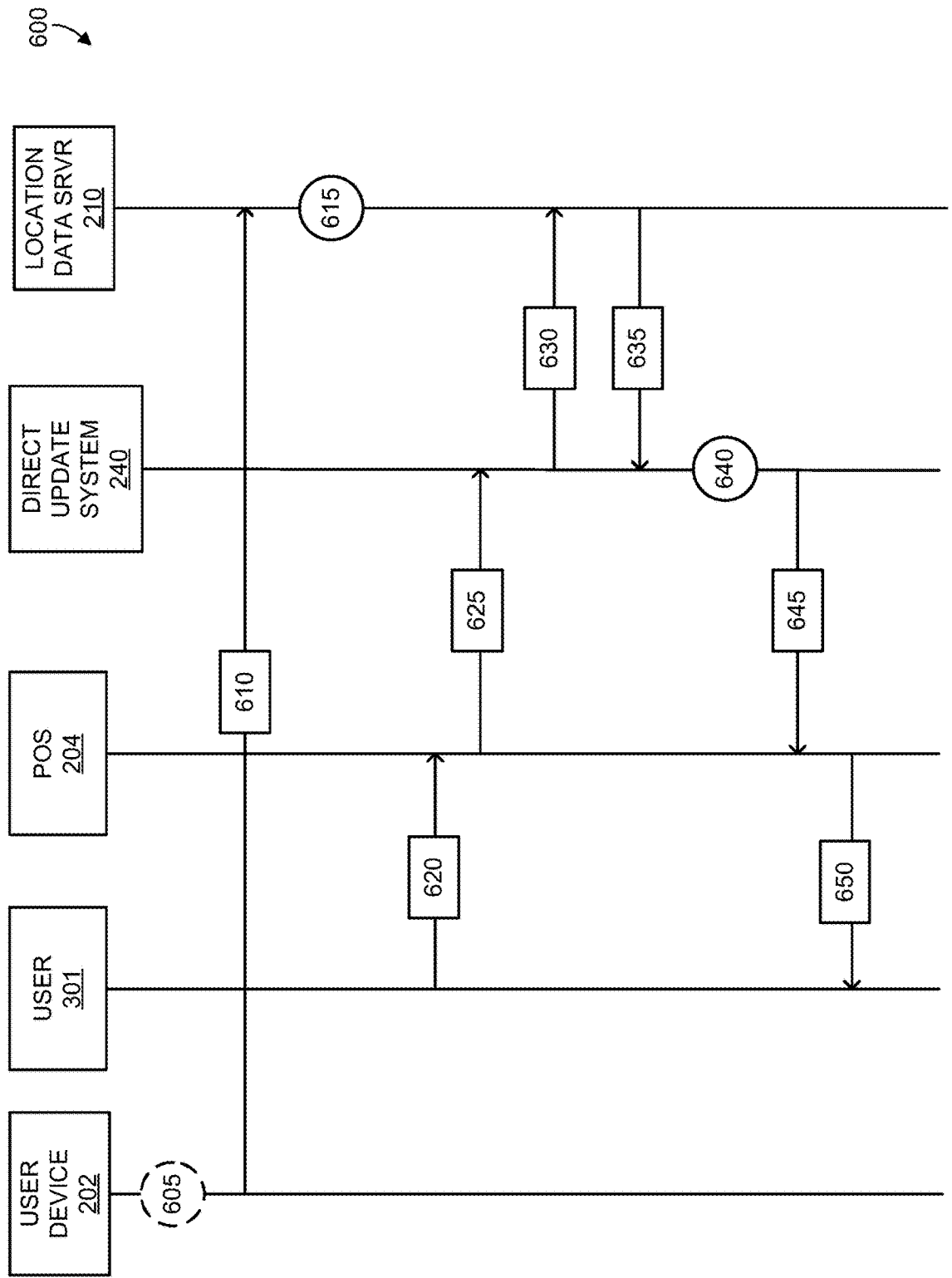
FIG. 6 is a diagram illustrating data flow and processes carried out by components involved in location data caching processes of the disclosed systems and methods, according to an example embodiment.

Similar to FIG. 5, FIG. 6 is another diagram illustrating data flow and processes 600 carried out by components involved in location data caching processes of the disclosed systems and methods, according to some embodiments. As was shown in the foregoing, a user device 202 optionally determines 605 whether it has traveled a threshold distance since its last check-in with location data server 210 or if a predetermined time period since the last check-in has expired. If user device 202 determines it is appropriate to send location data, user device can output 610 current location data to location data server 210. As above, location data server 210 can then process 615 the location data.

Similar to the foregoing examples, user 301 can initiate 620 a transaction with a merchant associated with point of sale device 204, and point of sale device 204 can then initiate 625 a transaction authorization with direct update system 240. Direct update system 240 can then request 630 updated location information from location data server 210. In contrast to the embodiment discussed in relation to FIG. 5, in the present embodiment, direct update system 240 is configured to receive updated information directly from location data server 210, but it is not configured to receive such updates dynamically. Location data server 210 can output 635 the requested updated location information, and direct update system 240 can analyze 640 the transaction to determine whether it is authorized by, for example, comparing location data associated with the request received from point of sale system 204 to the updated location information directly received from location data server 210. If the location information matches, direct update system 240 can output 645 an authorization confirmation to point of sale system 204, which can in turn finalize 650 the transaction with user 301.

Figure 7:
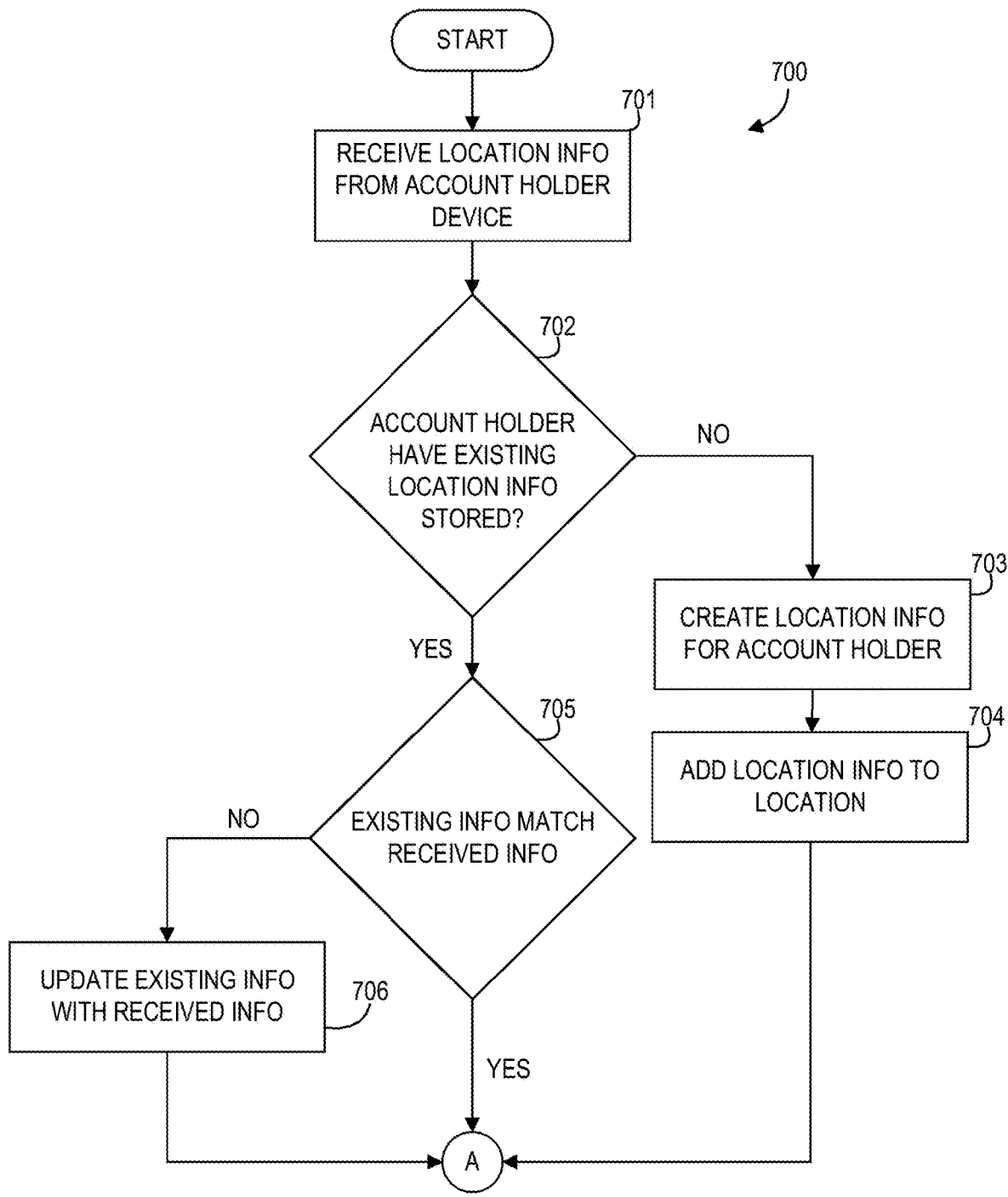
FIG. 7 is a flowchart of an exemplary method 700 for processing account holder location information, according to an example embodiment.

FIG. 7 is a flowchart of method 700 for processing location data received from a user device and determining whether the received information represents updated location data. Method 700 may be performed by location data server 210 using processor 212 to execute instructions in memory 224. In some embodiments, various steps associated with method 700 may be performed by other elements in environment 200, such as third-party receive system 220, third-party pull system 230, and/or direct update system 240. As shown in FIG. 7, according to some embodiments, method 700 may include receiving 701 location information from an account holder device (e.g., user device 202). Upon receipt of the location information, the method can determine 702 whether the account holder associated with the received location information has an existing account location information stored in the system (i.e., in location data server 210). If not, as shown in FIG. 7, method 700 can include creating 703 location information for the account holder. Creating location information can comprise generating an entry in a database for the account holder. For example, location data server 210 can create a new entry in its data storage system in a first data group, which can contain historical data relating to the respective user. This data entry can contain, for example, the latitude and longitude of the user, uniquely identifying information of the user, and a timestamp associated with when the request associated with the transaction was made. If, for example, the storage system for location data server 210 is an SQL database, location data server 210 may create a new row in a table with columns corresponding to each of these pieces of information, and the table would contain all historical location data for all account holders, and a separate table (i.e., a second data group) for caching the most recent location data for each account holder, which is quickly accessible. Continuing the above example, if the storage system for location data server 210 is an SQL database, the second data group may be a separate table with columns corresponding to, for example, latitude, longitude, and time stamp, and location data server 210 can either create a new row in the table for the respective user or update the user's existing row, but in an example configuration, each user would have only one row in the second data group (as opposed to potentially many rows in the first data group, which includes the historical information).

Figure 8:
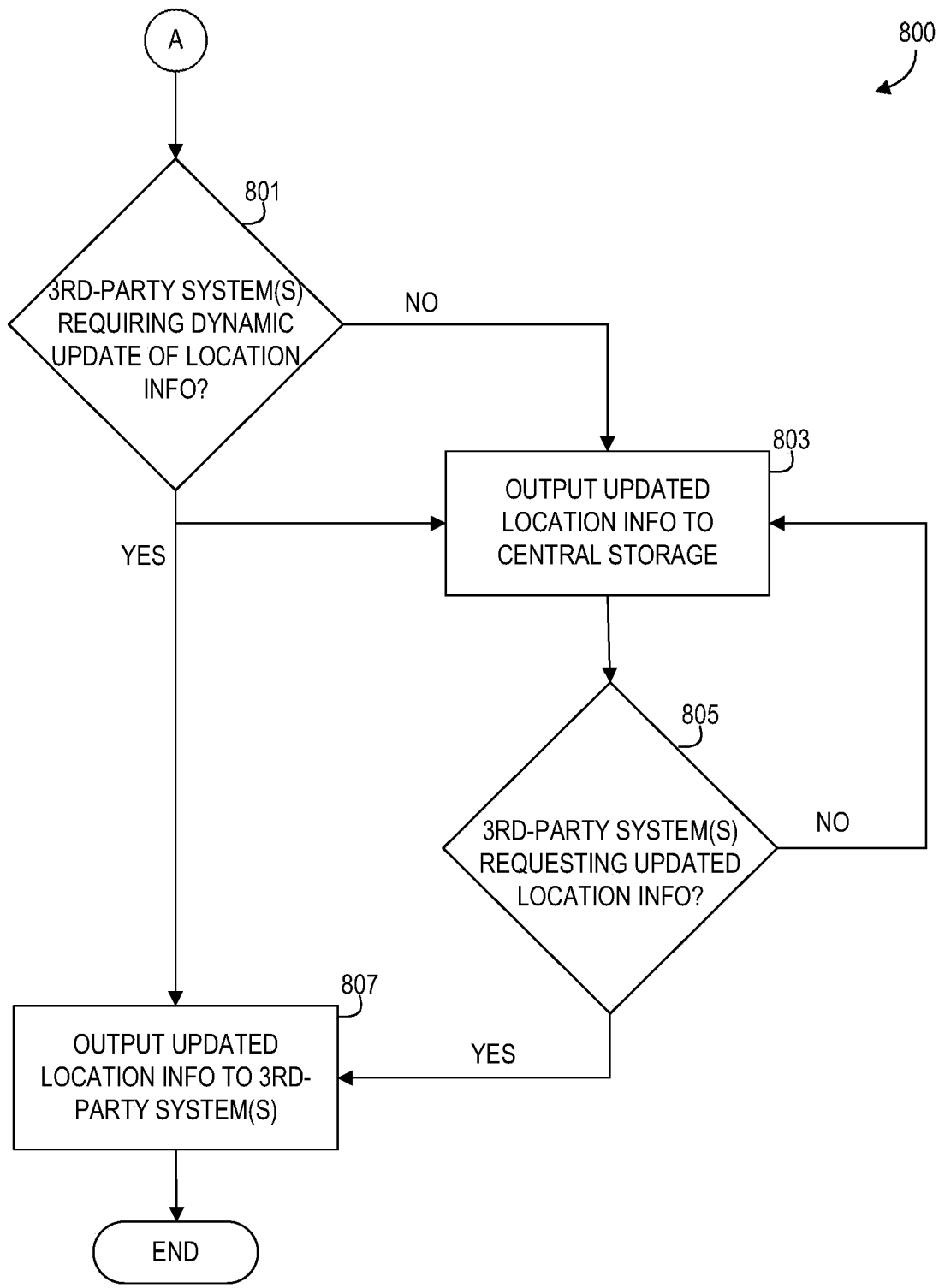
FIG. 8 is a flowchart of an exemplary method 800 for determining output locations for updated account holder location information, according to an example embodiment.

Subsequently, method 700 can include adding 704 the received location information to the database entry for the account holder (i.e., in the historical first data group and the cached second data group, which can occur as discrete processes) and then proceeding to determining output locations for updated account holder information, as will be discussed with respect to FIG. 8. If the system does have existing location information for the account holder, method 700 can further comprise determining 705 if the existing location information matches the received location data. If the stored/accessible information matches the stored information, the method 700 can include proceeding to determining output locations for updated account holder information (FIG. 8). If the information does not match, method 700 can include updating 706 the existing information to reflect the more-recent received information.

In some embodiments, location data server 210 stores the account holder's most recent location available for quick access by approved third-party systems, as shown in FIGS. 3-6. As location data server 210 receives new location data and updates the records for quick access, location data server 210 also can retain records of that account holder's past location data. As will be appreciated, this current data and/or the historical data can be made available quickly to third-party systems through a variety of techniques, including allowing third-party systems to pull data from the data storage system, allowing third-party systems to host the data storage system directly, or altering the system to provide subscribing third-party systems with the most up-to-date information by notifying those systems when there is updated data.

FIG. 8 is a flowchart of an exemplary method 800 for determining output locations for updated account holder location information, according to an example embodiment. Method 800 may be performed by location data server 210 using processor 212 to execute instructions in memory 224. In some embodiments, various steps associated with method 800 may be performed by other elements in environment 200, such as third-party receive system 220, third-party pull system 230, and/or direct update system 240. As shown in FIG. 8, method 800 can include determining 801 if there are third-party systems that require dynamic updates of location information. As will be understood, these will be systems configured to dynamically receive updated information from location data server 210 without communicating with central storage 218 (e.g., direct update system 240 as discussed in relation to FIG. 5). If there are third-party systems requiring direct, dynamic updates from location data server 210, method 800 can include outputting 807 updated location information to such third-party systems. In such instances, location data server 210 may directly relay the updated location data to any subscribing third-party services through a secure communication protocol, such as HTTPS, or a socket connection.

If no third-party systems require dynamic updates directly from location data server 210, method 800 can include outputting 803 updated location information to central storage 218 where central storage 218. It should be understood method 800 can include determining both that third-party systems require direct updates and that other connected third-party systems do not require such updates. Finally, as shown in FIG. 8, method 800 can include determining 805 whether third-party systems have requested updated information from central storage 218. If so, method 800 can include outputting 807 updated information to those systems (as discussed, for example, in relation to FIGS. 3 and 4). If not, method 800 can include periodically checking to determine the next time there is a third-party system requesting or requiring an update. As will be appreciated, preemptively storing updated account holder location information allows third-party systems to access the updated information in a manner that is low latency as compared to existing methods, which must query an account holder's mobile device to gain access to the information.

Figure 9:
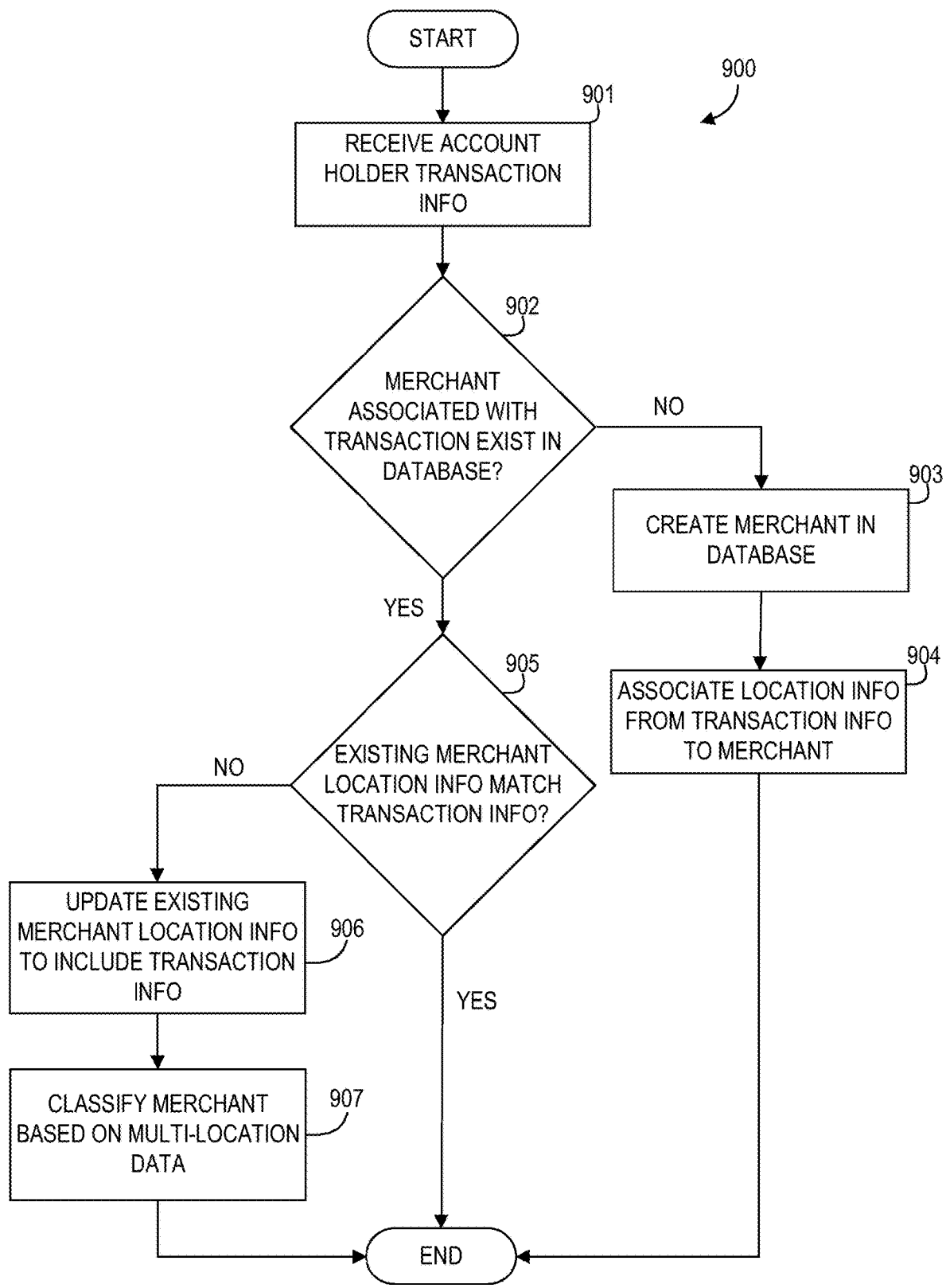
FIG. 9 is a flowchart of an exemplary method 900 for creating and updating merchant location data and merchant location type based on account holder transaction information, according to an example embodiment.

FIG. 9 is a flowchart of an exemplary method 900 for creating and updating merchant location data and merchant location type based on account holder transaction information, according to an example embodiment. Method 900 may be performed by location data server 210 using processor 212 to execute instructions in memory 224. In some embodiments, various steps associated with method 900 may be performed by other elements in environment 200, such as third-party receive system 220, third-party pull system 230, and/or direct update system 240. As shown in FIG. 9, method 900 can include receiving 901 account holder transaction information and determining 902 whether a merchant associated with the transaction exists. If not, method 900 can include creating 903 the merchant in the database and associating 904 the location information from the transaction information to the merchant. If the merchant associated with the transaction does exist, method 900 can include determining 905 if the existing location information associated with the merchant matches the location information received with the transaction information. If so, method 900 can end. If not, method 900 can include updating 906 existing merchant location information to include the location information from the transaction information and classifying 907 the merchant based on multi-location data.

Method 900 can employ various techniques for classifying the merchant. For example, method 900 can apply machine learning techniques related to clustering algorithms on this set of data to determine the following pieces of information for each merchant: the minimum number of centroids necessary to accurately describe the data with an average variance that is below a pre-defined, optimal threshold and the values of these centroids. For example, in one implementation, method 900 can use a k-means clustering algorithm. In that case, for a given merchant, method 900 would include performing the clustering algorithm with a k-value to estimate one centroid of the data, which would describe the central location of the merchant if the merchant were assumed to have one location. Using this centroid, method 900 could then calculate the associated average variance between each point in the dataset and the centroid. If this average variance was below a certain pre-defined, optimal threshold, then method 900 could declare that the merchant has one location. If this average variance was not below the threshold, method 900 could proceed to perform the clustering algorithm again with an incremented k-value by one. For each k-value, the clustering algorithm optimally could be performed to find the optimal k centroids of the data. For these given centroids, method 900 could: classify each data point as belonging to its closest centroid, calculate the average variance between each data-point and its centroid, and determine if the total average variance for that k-value is below the pre-defined, optimal threshold. This would repeat until the average variance is below the pre-defined, optimal threshold. The output of this technique would be the minimum number of centroids needed to accurately describe the data and the value of those centroids. For each merchant identifier, these two pieces of information can be mapped to a merchant's estimated number of locations and estimated latitude and longitude of those locations, respectively.

Method 900 could then proceed by taking this data and using supervised learning techniques to classify the merchant into a given location-type. For a given merchant, the input for this supervised learning algorithm would be the number of locations and latitude and longitude for each location. The output would be a classification label according to the merchant's location-type, such as single-location, multi-location, and mobile-location. The supervised learning algorithm would first consume a list of known merchant location-types with the relevant input data for that merchant to train the algorithm and select the optimal algorithm parameters and algorithm type. For the example of using the location-types of single-location, multi-location, and mobile-location, one possible implementation technique would be using a decision tree for classification. For this implementation, method 900 would assemble a list of merchants, with each merchant having an associated number of locations, a latitude and longitude for each location, and a known training label of single-location, multi-location, or mobile-location. Method 900 would then split this data into a training and test set. The decision tree algorithm would then be trained on the training set of data and tested on the testing data to estimate the real-world accuracy. This process could then be iterated with a set of different parameters and algorithm types until the optimal parameters and algorithm type that maximize the testing accuracy are determined. Other possible implementation choices for a supervised-learning, classification algorithm include, but are not limited to, recurrent neural networks and support vector machines.

Figure 10:
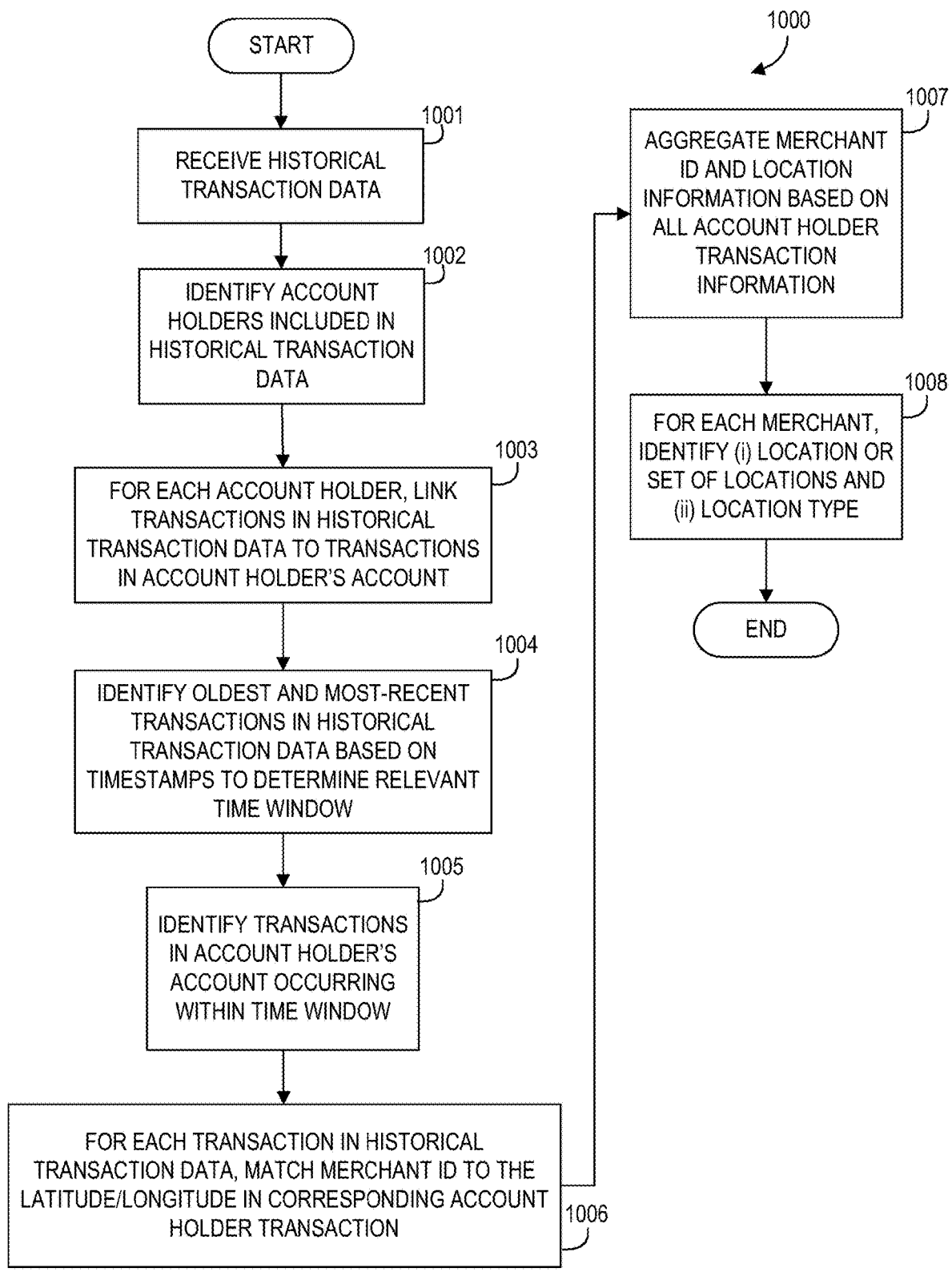
FIG. 10 is a flowchart of an exemplary method 1000 for identifying one or more locations associated with a merchant and determining a merchant type based on historical account holder transaction information, according to an example embodiment.

FIG. 10 is a flowchart of method 1000 for identifying one or more locations associated with a merchant and determining a merchant type based on historical account holder transaction information, according to an example embodiment. Method 1000 may be performed by location data server 210 using processor 212 to execute instructions in memory 224. In some embodiments, various steps associated with method 1000 may be performed by other elements in environment 200, such as third-party receive system 220, third-party pull system 230, and/or direct update system 240. One of skill in the art will appreciate that the disclosed systems and methods can assemble an accurate record of merchant locations and merchant-location types. For third-party systems to accurately use cached location data, such as for authenticating transactions, the account holder location often must be referenced against an existing record of the merchant's location. As will be appreciated, for this comparison to provide accurate authorization with merchants whose current locations do not match the location listed in the existing record, such as when a merchant's address on file is incorrect or a merchant is a mobile-location merchant, the disclosed systems and methods can, from a large record of past verified transactions linked with account holder geolocations, assemble a record of accurate merchant locations. Additionally, the disclosed systems and methods include techniques for determining the number of locations out of which a given merchant operates and can classify merchants based on their location-type. As will be appreciated, these location-types can provide monitoring systems with accurate distinctions of merchants based on how many locations each merchant uses to perform business. According to certain embodiments, the disclosed systems and methods can classify a merchant as "single location" (i.e., merchants with a single, fixed location that perform transactions originating from a single geographic location), "multi location" (i.e., merchants with multiple, fixed locations that perform transactions originating from multiple geographic locations), and "mobile location" (i.e., point-of-sale merchants that maintain a static business addresses while transacting in various locations). As also will be appreciated, aspects of the disclosed technology continually and dynamically update this set of merchant locations as opposed to at a single fixed point in time. As will be appreciated, continually updating the merchant location information provides more accurate information since, for example, merchants may move but neglect to change their listed addresses, or a merchant can have multiple storefronts but a single listed address, or a merchant can be a mobile-location merchant.

As shown in FIG. 10, method 1000 can include receiving 1001 historical transaction data (discussed further in relation to FIG. 12), and identifying 1002 account holders included in the historical transaction data. Further, method 1000 can include linking 1003 transactions the in the historical transaction data to transactions in a respective account holder's account for each account holder represented in the historical data. Method 1000 can further include identifying 1004 both oldest and most-recent transactions in historical transaction data based on timestamps to determine a relevant time window and then identifying 1005 transactions in an account holder's account that occur within that time window. As shown, method 1000 can include, for each transaction in the historical transaction data, matching 1006 a merchant ID to the latitude/longitude in the corresponding account holder transaction. Further, method 1000 can include aggregating 1007 merchant ID and location information based on account holder transaction information for multiple account holders. Finally, as shown in FIG. 10, method 1000 can include identifying 1008 a location or set of locations for each merchant and a location type for each merchant.

Figure 11:
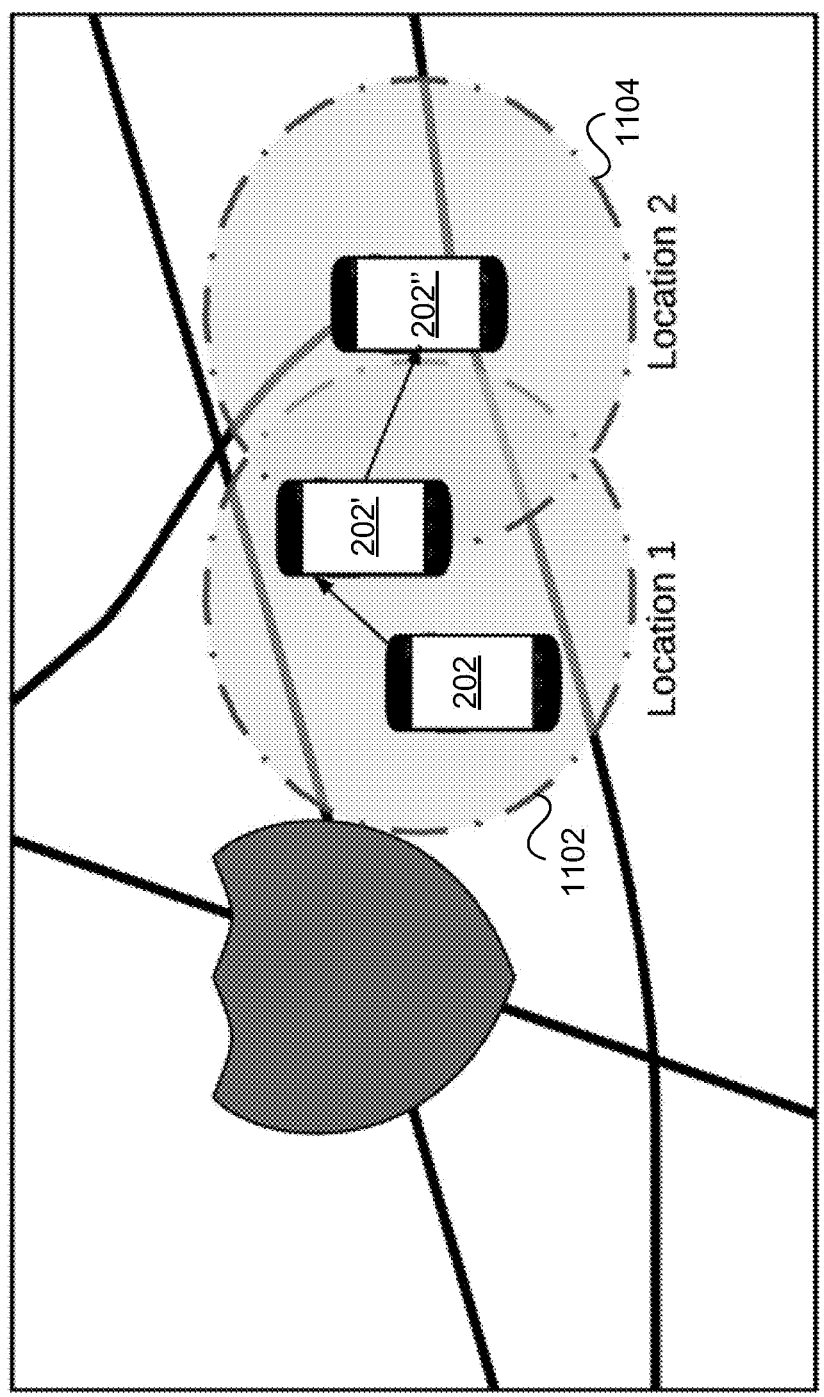
FIG. 11 illustrates an exemplary thresholding technique used by an application of the present disclosure executing on a user device 202 to determine when to update a location data server 210 with account holder location data, according to an example embodiment.

FIG. 11 is an overview of an exemplary thresholding technique for determining when to update location data server 210 with account holder location data, according to some embodiments of the disclosed technology. In an example implementation, an application executing on user device 202 can process location data information to determine when updates to location data server 210 are necessary. In particular, in some implementations, such an application executing on user device 202 can request, from the account holder (i.e., the user associated with user device 202) necessary permissions for accessing the account holder's location data (i.e., the location data associated with user device 202). Depending on the implementation, the application may request access to location data while the user is actively using the application (i.e., when the application is in an active mode) or, for more accurate results, both when the application is being used and is not being actively used (i.e., when the application is in a background mode).

In some embodiments, after receiving approval for accessing location data, the application can record an initial location for user device 202. The application can then send this initial location information to location data server 210, as has been discussed. After the initial location is determined, the application can continually monitor the location of user device 202 or monitor when the application is active, depending on the implementation. When the monitored location information changes, the application can determine a change in distance and compared that difference to a pre-defined distance threshold. If the change-in-location distance does not exceed the pre-defined distance threshold, the application will not trigger the API to location data server 210, and no update will be provided to the information currently available at (or through) location data server 210.

As noted, FIG. 11 provides an overview of this process as it shows user device 202 as it moves from location A to location B (where it is shown as 202'). Because this location change is less the pre-defined threshold illustrated by circle 1102 (i.e., Location 1), the application does not output updated location information and remotely stored location information associated with user device 202 is not updated. As noted previously, if user device 202 undergoes a location change that does exceed the pre-defined threshold (i.e., user device 202 moves from location B to location C (where it is shown as 202" in circle 1104 (i.e., Location 2))), the application executing on user device 202 can make a call to an API of location data server 210 and provide location data for updating the remote record associated with user device 202, according to some implementations. Additionally, the application can make a local record of the new location to reference for future location changes.

As will be appreciated, the techniques illustrated in FIG. 11 and discussed above reduce overall information being sent to location data server 210 and reduce costs associated with sending that information, particularly as compared to systems that update location information based on every location change. In some implementations, to determine an appropriate tradeoff between, on the one hand, location accuracy and, on the other, device power and data consumption, the disclosed methods may consider a minimum time threshold and a maximum time threshold in addition to a distance threshold when making determinations about whether to output updated location information. Accordingly, in some implementations, an application executing on user device 202 may periodically determine whether the time that has passed since the last location update is less than a minimum time threshold and, if it is, take no action. If the time that has passed is greater than the minimum time threshold but less than the maximum time threshold, the application will evaluate distance changes as discussed above and provide updates as discussed. And if the time that has passed is greater than the maximum time threshold, the application can output updated location information to location data server 210 irrespective of the distance thresholds. In an example implementation, parameters may be five minutes for the minimum time threshold, one hour for the max time threshold, and 0.5 miles for the distance threshold, though these parameters can be adjusted based on the desire for increased location accuracy, decreased usage of user device 202 resources, or other factors.

Figure 12:
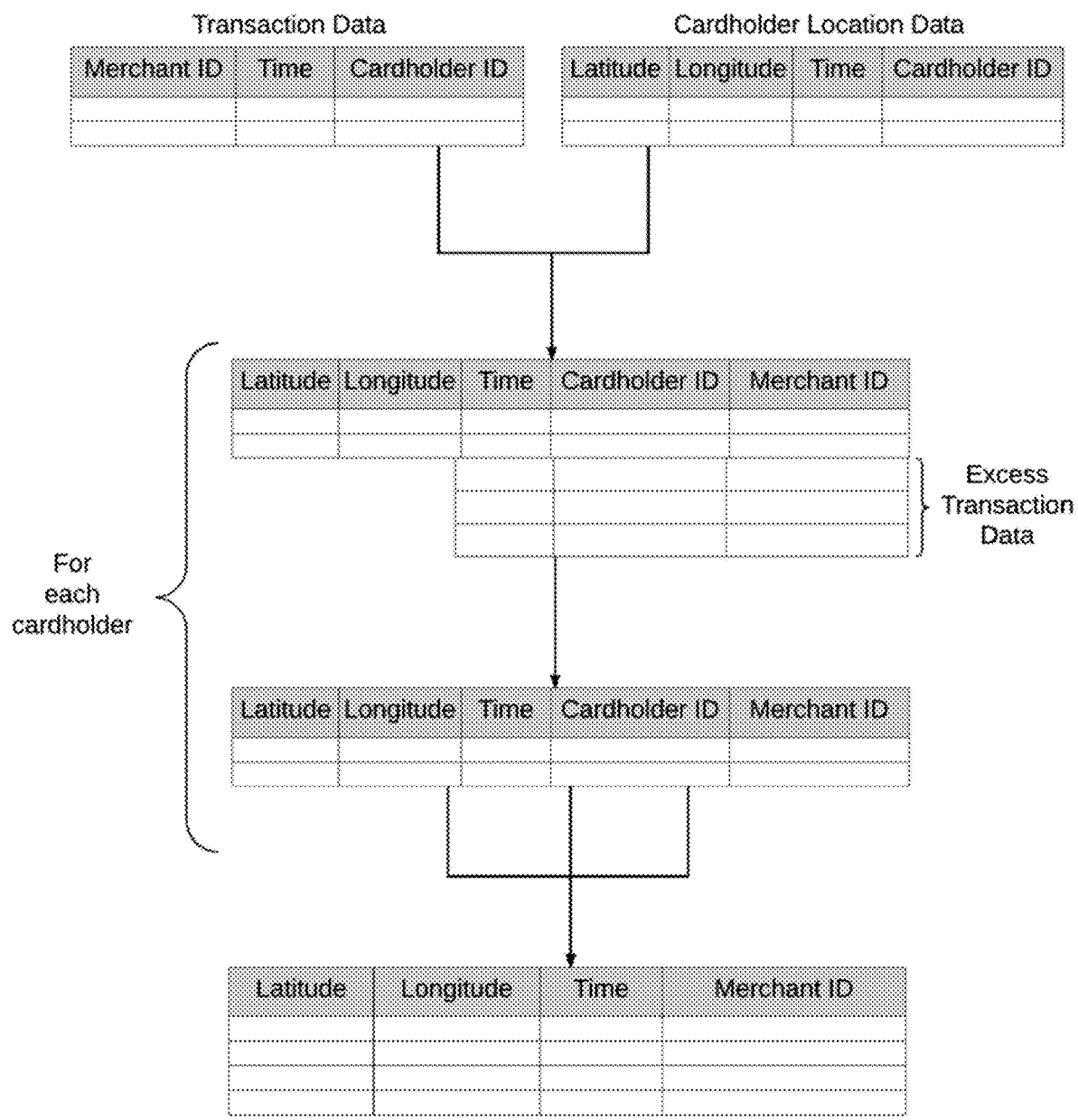
FIG. 12 illustrates various steps for processing sets of transaction and account holder location data to derive a set of financial institution and merchant location data over a period of time, according to an example embodiment.

FIG. 12 illustrates various steps for processing sets of transaction and account holder location data to derive a set of financial institution and merchant location data over a period of time, according to an example embodiment. As discussed in relation to FIG. 9, after the aforementioned systems and methods have executed over a period of time for a set of account holders, thereby creating an historical record, the relevant data storage third-party systems will have access to accurate account holder location data over a period of time for the set of account holders, thereby allowing for determination of a set of point-of-sale merchant locations at various times by linking merchant transaction data to the aforementioned account holder location data, as has been discussed. It should be noted that while this method specifically discusses applying this technique for deriving locations of merchants, the same method can be applied to other financial institutions so long as the account holder is in the same location as the financial institution for a given transaction.

As shown in FIG. 12, and as discussed herein, the disclosed systems and methods can receive transaction data over time (e.g., from a card company, from a transaction authorization switch, from a particular payment processing system, etc.). The systems can receive transaction data through a variety of methods, including referencing a data storage system, importing an externally-provided set of information, or accumulating transaction data over time by exposing an API that allows third parties to relay transaction information. The transaction data can include features related to, at minimum, a unique merchant identifier associated with the transaction, the time of the transaction, and information that can be utilized to link a given transaction to the uniquely-identifying information of the transaction's respective account holder within the account holder location data as discussed above.

As shown in FIG. 12, and as discussed in relation to FIG. 10, according to certain embodiments, for each account holder within the set of historical location data, the respective transactions for that account holder can be identified by linking that account holder's uniquely-identifying information to the account holder information provided with the transaction data. As will be appreciated, this can be done through a variety of methods depending on the implementation, including an iterative loop or a set of joining and grouping operations between the transaction and account holder location data. After a set of transactions for each account holder is determined, the oldest and newest timestamp can be determined from the set of an account holder's location data. All transaction data with timestamps that are not within this time range can be excluded from consideration for a given account holder. Then, for each transaction within the relevant time range, the information relating to the merchant identifier can be linked to the account holder's latitude and longitude at the time of the transaction. This could be done through a variety of implementation techniques such as, for each transaction, referencing the time of the transaction and determining where the account holder was located at the time of that transaction.

As further shown in FIG. 12, after performing this operation for each transaction and for each account holder, the method will have assembled a list of merchant identifiers linked with timestamp data and estimated latitude and longitude based on account holder latitude and longitude. This data can then be joined together for all account holders available within the system, as shown in FIG. 12. Subsequently, the data can be separated into groups containing relative data for each merchant. This could be done through a variety of methods depending on the implementation, including an iterative loop or a set of grouping operations performed on the merchant identifier.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases and Advantages The following exemplary use case describes one example of a typical user flow pattern. It is intended solely for explanatory purposes and not in limitation. A transaction authorization system can be given access to the stored geolocation data for a given account holder. If this account holder has just traveled to a different country but has not informed its card issuer of their traveling, then the transaction authorization system will be made aware of the account holder's new location through the processes discussed above. In other words, the authorization system will not be aware of the account holder's travels until the account holder attempts to make a transaction. In that example, when the account holder attempts to make a purchase at a local vendor, according to the disclosed systems and methods, the transaction authorization system will be able to reference the account holder's cached location data to better inform the process of whether it should approve or decline the transaction. In the foregoing example, the authorization system may choose to correctly approve the purchase based on the cached location information received from the account holder's device. Previous solutions, which did not have access to the cached location information, may have been declined the transaction based simply on the fact that the transaction originated in an "unfamiliar" location, thereby preventing a loss of value for the merchant, account holder, and card issuer.

As will be appreciated, the disclosed systems and methods are useful in the authorization of point-of-sale transactions as well as the authorization of mobile, e-commerce or online, and ATM transactions. For example, in the case of an online transaction, an account holder can initiate a purchase from an online merchant. Methods exist for the merchant (i.e., the online payment system), upon the account holder initiating a transaction, to trace the account holder's IP address and derive a geofence that in which the account holder must be location the account holder must be located within. Using the disclosed systems and methods, it's possible for an authorization system to simultaneously query the account holder's location with very low latency. The disclosed systems and methods can then compare the account holder's location to the geofence and, if the comparison reveals that the account holder's mobile device is in a different location than that from which the transaction was initiated (i.e., the determined geofence), the system may decide to decline the transaction. As will be appreciated, this would provide value to the overall ecosystem for online transactions especially, as these are a huge source of fraud and identity theft.

One of skill in the art also will appreciate that, as discussed above, the disclosed systems and methods can accumulate a history of card transaction data linked to an accurate record of an account holder's locations at the times of the transactions. This data can be used to enhance the accuracy of a variety of functions that provide value-added services, products, features, and capabilities to the card issuer or the account holder's experience. For example, such data can be used to augment user behavior profiles that are managed by card companies' fraud detection systems. Deviations from typical location-transaction behavior patterns for an account holder may trigger a fraud warning. This history of location-transaction patterns for an account holder may not be accurate if a merchant's listed address is used to deduce the location of a transaction, such as when a merchant address on record is incorrect or if the merchant is a multi-location or mobile-location merchant. This decreases the overall accuracy of the monitoring system. Having verified location data linked to past transactions can improve the overall accuracy of these monitoring systems.

As will further be appreciated, monitoring systems can use the improved accuracy in the location data of merchants to improve the overall accuracy and performance of these existing monitoring systems. In the example of a fraud detection system, the improved merchant location data can improve the classification of fraudulent transactions, which provides value to multiple parties. In this example, the improved accuracy benefits card issuers by reducing the overall costs associated with maintaining call centers by reducing the amount of incoming customer service calls, reducing the number of false-positives (transactions incorrectly classified as fraudulent), and reducing the overall risk that the card issuers bear. This improved reliability benefits merchants by reducing overall fraud and helping them qualify for faster payment schemes, such as ISO 20022, which can lead to an increase in merchants' liquid capital. This improved accuracy also benefits the account holder by further protecting them against fraudulent transactions and by reducing the time wasted and dissatisfaction associated with false-positive fraudulent or declined transactions.

In another example, improved information provided by the disclosed systems and methods can be used to augment user behavior profiles that are managed to predict when a user may make a transaction. These predicted spend events can be used for several purposes including, but not limited to, more accurately determining when a person has a drop-off in preference for a particular card based on a decline in spend frequency for a given location or more accurately offering incentives to change typical spend behavior towards a favorable outcome for the card issuer, such as incentivizing the account holder to spend more, change spend to a competing merchant, or change spend to an alternative card product. Additionally, an accurate record of merchant locations and location types can be continuously leveraged to accurately infer the location of account holders that do not have devices capable of, or enabled for, location-tracking. This information can then be used to offer location-based rewards, discounts, and offers to this subset of account holders, as will be appreciated.

Finally, one of skill in the art will appreciate that the disclosed systems and methods can provide access to account holder location data even when transactions do not occur. As previously explained, a limitation of existing methods is that they typically only query account holder location in response to the account holder making a transaction. The disclosed systems and methods are uniquely useful for accurately determining when an account holder is in a given location irrespective of performing a transaction. For example, an existing card monitoring system may monitor a set of account holders for a period of time and determine that they are typically make a transaction whenever they enter a certain geographic region. But these existing systems are not able to infer when those account holders enter a geographic region and do not make a transaction because those systems only query the account holders' location in response to a transaction event, thus hindering these systems' predictive capabilities. The disclosed systems and methods, however, have access to the account holders' location data regardless of transactions and are able to determine that an account holder entered a certain geographic region and did not make a transaction. As will be appreciated, this improves the overall predictive capabilities and underlying accuracy of the card monitoring system.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method comprising:
receiving, at a first computing device, updated location information from a second computing device, the second computing device associated with an account holder;
determining, at the first computing device, whether location information associated with the account holder exists at the first computing device;
responsive to determining that location information associated with the account holder does not exist at the first computing device:
generating, by the first computing device, an entry in a first data group for storing information associated with the account holder; and
adding, by the first computing device, information associated with the account holder to the entry in the first data group;
responsive to determining that location information associated with the account holder does exist at the first computing device and that the location information at the first computing device does not match the updated location information:
updating, by the first computing device, the location information at the first computing device to include the updated location information; and
determining, by the first computing device, one or more output locations for the updated location information;
responsive to determining that the location information at the first computing device and the updated location information are matching location information, determining, by the first computing device, the one or more output locations for the matching location information;
responsive to determining that one or more third-party systems require dynamic updates, outputting, from the first computing device and to the one or more third-party systems, the updated location information and/or the matching location information; and
outputting the updated location information and/or the matching location information to a central storage in response to determining that the one or more output locations includes the central storage, wherein the central storage is configured to (i) dynamically output the updated location information and/or the matching location information to one or more third-party receive systems and (ii) responsive to a request from a third-party pull system, output the updated location information and/or the matching location information, and wherein the one or more third-party receive systems and the third-party pull system are associated with one or more transaction authorization systems.

2. The method of claim 1, wherein the entry in the first data group comprises uniquely identifying information relating to the account holder, location information comprising latitude and longitude information associated with the account holder, and a timestamp associated with a transaction initiated by the account holder with a merchant.

3. The method of claim 2, wherein the uniquely identifying information relating to the account holder comprises a unique identifier associated with a card transaction card associated with the account holder.

4. A system comprising:
one or more processors; and
a memory in communication with the one or more processors and storing instructions that, when executed by the one or more processors, are configured to cause the system to:
receive updated location information from a computing device associated with an account holder;
determine whether location information associated with the account holder exists at the system;
responsive to determining that location information associated with the account holder does not exist at the system:
generate an entry in a first data group for storing information associated with the account holder; and
add information associated with the account holder to the entry in the first data group;

responsive to determining that location information associated with the account holder does exist at the system and that the location information at the system does not match the updated location information:
- update the location information at the system to include the updated location information; and
- determine one or more output locations for the updated location information; and responsive to determining that the location information at the system and the updated location information are matching location information, determine the one or more output locations for the matching location information, wherein determining the one or more output locations for the updated location information and/or the matching location information comprises outputting, from the system and to one or more third-party systems, the updated location information and/or the matching location information in response to determining that the one or more output locations includes one or more third-party systems that require dynamic updates.

5. The system of claim 4, wherein the entry in the first data group comprises uniquely identifying information relating to the account holder, location information comprising latitude and longitude information associated with the account holder, and a timestamp associated with a transaction initiated by the account holder with a merchant.

6. The system of claim 5, wherein the uniquely identifying information relating to the account holder comprises a unique identifier associated with a card transaction card associated with the account holder.

7. The system of claim 5, further storing instructions that, when executed by the one or more processors, are configured to cause the system to:
- output the updated location information and/or the matching location information to a central storage in response to further determining that the one or more output locations includes the central storage, wherein the central storage is configured to (i) dynamically output the updated location information and/or the matching location information to one or more third-party receive systems and (ii) responsive to a request from a third-party pull system, output the updated location information and/or the matching location information, and wherein the one or more third-party receive systems and the third-party pull system are associated with one or more transaction authorization systems.

* * * * *